(12) United States Patent
Binnard

(10) Patent No.: US 6,650,079 B2
(45) Date of Patent: Nov. 18, 2003

(54) SYSTEM AND METHOD TO CONTROL PLANAR MOTORS

(75) Inventor: Michael B. Binnard, Belmont, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/870,753

(22) Filed: Jun. 1, 2001

(65) Prior Publication Data

US 2002/0180395 A1 Dec. 5, 2002

(51) Int. Cl.⁷ .......................... H02K 41/00; G05B 11/00
(52) U.S. Cl. .................. 318/649; 318/632; 318/687; 74/471 XY
(58) Field of Search .................... 318/648, 649, 318/632, 653, 687; 310/12; 74/471 XY

(56) References Cited

U.S. PATENT DOCUMENTS

| | | | |
|---|---|---|---|
| 4,506,205 A | * | 3/1985 | Trost et al. .................. 318/653 |
| 4,535,278 A | | 8/1985 | Asakawa |
| 4,626,749 A | | 12/1986 | Asakawa |
| 4,654,571 A | | 3/1987 | Hinds |
| 4,742,286 A | | 5/1988 | Phillips |
| 4,908,558 A | | 3/1990 | Lordo et al. |
| 5,126,648 A | | 6/1992 | Jacobs |
| 5,528,118 A | | 6/1996 | Lee |
| 5,623,853 A | | 4/1997 | Novak et al. |
| 5,777,402 A | | 7/1998 | Chitayat |
| 6,097,114 A | * | 8/2000 | Hazelton ...................... 310/12 |
| 6,144,119 A | | 11/2000 | Hazelton |
| 6,252,234 B1 | | 6/2001 | Hazelton et al. |

OTHER PUBLICATIONS

Rudolf Graf, Radio Shack "Dictionary of Electronics". Radio Shack, A Tandy Corporation Company, 1972, p. 334, the definition of "Lorentz Force".*

Stephen Chapman, "Electric Machinery Fundamentals", Third Edition, McGraw–Hill Publisher, 1999, pp. 10–11, the definition of electromotive force, and p. 711, the index does not show any "Lorentz force".*

Fishbane et al, "Physics for Scientists and Engineers". Prentice Hall Publishing, 1996. pp. 781–782.*

* cited by examiner

*Primary Examiner*—Bentsu Ro
(74) *Attorney, Agent, or Firm*—Finnegan, Henderson, Farabow, Garrett & Dunner, L.L.P.

(57) ABSTRACT

A method for controlling and positioning a two-dimensional electric motor is disclosed. The electric motor has a coil array and a magnet array. The method controls the motor in two directions in the plane of the magnet array and about a third direction generally orthogonal to the plane. The method includes: determining currents for generating the desired forces, determining a resultant torque that would be generated from applying the determined currents, determining current adjustments to compensate for the resultant torque, and applying a current equal to the sum of the determined currents and the current adjustments to the coils to interact with the magnetic fields of the magnet array. The currents are applied to the portion of the coil array within the magnetic field of the magnet array, including those coils which are only partially within the magnetic field of the magnet array. Alternatively, the currents could be applied to all of the coils. Applying the current to all of the coils requires more electrical power, but uses for amplifiers so the electronics are simpler and less expensive. The method of the present invention may be used in applications such as positioning wafers in semiconductor fabrication.

37 Claims, 8 Drawing Sheets

SYSTEM AND METHOD TO CONTROL PLANAR MOTORS

TECHNICAL FIELD

This invention relates generally to electric motors and more particularly to three degree of freedom control of electric planar motors.

BACKGROUND ART

Electric motors are used in a variety of electrical equipment. For example, wafer stages utilize linear or planar electric motors to position a wafer during photolithography and other semiconductor processing.

U.S. Pat. No. 5,623,853, entitled "Precision Motion Stage with Single Guide Beam and Follower Stage" to Novak et al. and U.S. Pat. No. 5,528,118, entitled "Guideless Stage With Isolated Reaction Stage" to Lee ("the '118 patent") discuss examples of semiconductor fabrication equipment and are incorporated herein by reference in their entireties.

U.S. Pat. No. 4,654,571, entitled "Single Plane Orthogonally Moveable Drive System" to Hinds ("the '571 patent") and U.S. Pat. No. 4,535,278, entitled "Two-Dimensional Precise Positioning Device for Use in a Semiconductor Manufacturing Apparatus" to Asakawa ("the '278 patent") discuss two-dimensional planar electric motors. The motors are two-dimensional in that they have two-dimensional arrays of magnets and armatures instead of magnet tracks and one-dimensional armatures. Further, the magnet arrays and two-dimensional armatures may move with respect to each other in more than two dimensions depending upon the design. Conventional two-dimensional linear motors typically have an array of magnets and an armature having one or more coils disposed on one side of the array of magnets.

The '278 patent describes a three degree of freedom planar motor and a control method for independently producing forces in the X, Y and $\theta_z$ (rotation about Z) directions. The method described in the '278 patent is better suited for a moving-coil electric planar motor. In a moving magnet array electric planar motor, the '278 patent describes a method of controlling the motor that can only produce force with groups of four coils that are fully within the magnetic field of the magnet array. In other words, only coils which are completely covered by the magnet array are used to generate forces and coils which are only partially covered by the magnet array are not used to generate forces. Thus, to provide three degree of freedom control of the planar motor at every position, the magnet array must be sufficiently large to cover an area of at least 5 by 3 coils such that 4 by 2 coils are always completely within the magnetic field of the magnet array at all times.

A platform is attached to the two-dimensional electric motor such that it can be moved and positioned in two or more dimensions by the electric motor. For example, a wafer stage in semiconductor processing equipment may be attached to a coil array or magnet array of a two-dimensional motor and the two-dimensional motor would control the positioning of the wafer stage.

When used to position a platform, conventional two-dimensional electric motors do not smoothly and accurately position the platform. Presently, the coil array in a typical two-dimensional electric motor moves with respect to a stationary magnet array. As exemplified in the '571 patent, cables and hoses are attached to the coil assembly to supply electrical current and coil cooling fluid or air supply to the coils, respectively. However, the hoses and cables impede free motion of the coil assembly.

Thus, it would be desirable to provide an accurate and efficient method of controlling a planar electric motor such that it can be driven to position the platform in three degrees of freedom. It would also be desirable to provide a planar electric motor whose accuracy in positioning is not limited by wiring and/or coil coolant hoses.

SUMMARY OF THE INVENTION

The present invention comprises a system and method for controlling electric planar motors to move and position in three degrees of freedom. The electric planar motor of the present invention is preferably a moving magnet array electric motor comprising a magnet array and a coil array. The current supplied through coils of the coil array interacts with the magnetic field of the magnets of the magnet array to generate forces between the magnet and coil arrays. The generated forces provide motion of the magnet array relative to the coil array in a first direction, a second direction, and rotation about a third direction. The present invention teaches the levels of current to be applied to the coils to achieve accurate control of the electric planar motor in three degrees of freedom.

The controlling method of the present invention is achieved by the interaction of current in the coil and a magnetic field associated with the magnet. The method for controlling a planar electric motor for positioning in three degrees of freedom, includes (1) positioning a magnet array over a portion of a coil array, the magnet array including magnets with magnetic fields and the coil array including coils generally disposed in a plane; (2) determining the currents to be applied to the coils to generate forces between the magnet array and the coil array in a first (X) and second (Y) directions defined by the plane; (3) determining a resultant torque between the magnet array and the coil array generated by the forces; (4) determining current adjustments to compensate for or cancel out the resultant torque; and (5) applying a sum of the currents and current adjustments to the coils to interact with the magnetic fields of the magnet array. The method may also be adapted and used to determine the current to be applied to control a planar electric motor in three degrees of freedom.

The method for controlling a planar electric motor for positioning in three degrees of freedom may further include determining the position of the magnet array relative to the coil array and using the determined position in determining currents, resultant torque and/or current adjustments. The currents to be applied to coils in the portion of the coil array may be selected from sinusoidal, triangular and square waveforms. The method may further include determining the forces to be generated between the magnet array and the coil array in the X and Y directions to result in forces in the X and Y directions and/or the torque about Z. The current adjustments may be determined for each coil in the portion of the coil array.

The present invention utilizes all the coils within the magnetic field of the magnet array, including those which are only partially within the magnetic field of the magnet array. Thus, the currents to be applied to the coils may be determined only for coils in that portion of the coil array and the sum of the currents and current adjustments is applied only to coils in that portion of the coil array.

In another aspect of the present invention, a method for positioning a wafer in a lithography system is provided. The method includes: (1) providing a frame, a stage for supporting the wafer and movable to position the wafer relative to the frame, a coil array attached to the frame, and a magnet array adjacent a portion of the coil array, the magnet array being attached to the stage and having magnets generally disposed in a plane, the plane defining a first and second direction; (2) determining currents to be applied to coils in the portion of the coil array to generate forces between the magnet array and the coil array in the first and second directions; (3) determining a resultant torque between the magnet array and the coil array generated by the forces; (4) determining current adjustments to compensate for the resultant torque; and (5) applying a sum of the currents and current adjustments to the coils to interact with magnetic fields of the magnet array.

In another aspect of the present invention, a planar motor is provided. The planar motor includes (1) a first member; (2) a second member that interacts with the first member to generate driving force, the second member being movable relative to the first member at least two directions by the driving force; and (3) a controller connected to at least one of the first member and second member, the controller determining information related to a resultant torque between the first member and the second member.

The planar electric motor and its control method may also be used in a positioning device. The positioning device has a support member such as a stage, a magnet array, and a coil array. In a moving magnet array planar motor, the support member is attached to the moving magnet array and is positionable by the electric motor in three degrees of freedom. Alternatively, the support member is attached to the moving coil array and is positionable by the electric motor in three degrees of freedom.

The method appropriately commutates coils and results in accurate and precise movement and positioning of the stage. The methods provide an electrical current distribution or commutation to the active coils of the coil array to control movement of the magnet array with respect to a coil array.

The method applies to both moving magnet and moving coil electric motors although the moving magnet array electric motor is preferred. The moving magnet array electric motor provides more accurate positioning than conventional moving coil electric motors. The moving magnet electric motor does not require wire connections or cooling hoses to the moving part of the motor. Conventional two-dimensional electrical motors are moving coil motors having wires and cooling hoses connected to the moving coil array. By eliminating wires and hose connections to the moving component, positioning devices using the moving magnet array are more accurate than conventional moving coil platforms. However, although the present invention is described in terms of a moving magnet array electric motor, the electric motor may be modified to be a moving coil array electric motor wherein the coil array moves relative to the magnet array.

The invention's electric motors and positioning devices should be useful in environments requiring precise and wide ranges of positioning. The electric motor and method of the present invention is particularly useful in positioning wafers in semiconductor fabrication processes.

DESCRIPTION OF THE INVENTION

The present invention comprises a system and method for controlling electric planar motors to move and position in at least three degrees of freedom. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
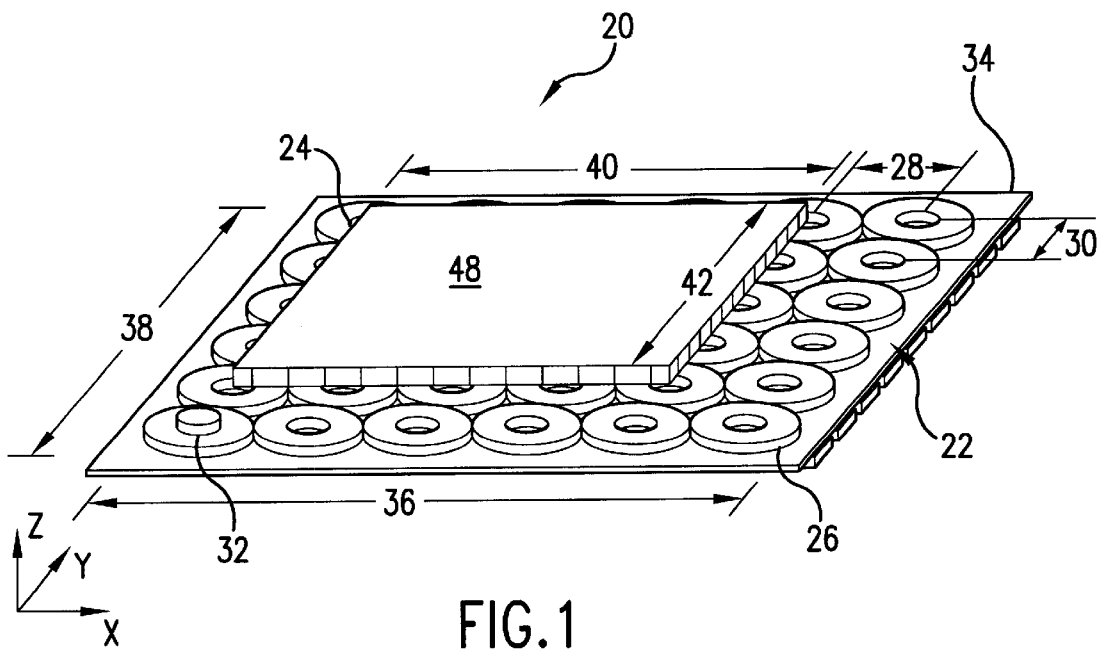
FIG. 1 shows a perspective view of a moving magnet electric motor in accordance with one aspect of the present invention.

FIG. 1 illustrates a moving magnet electric planar motor 20 in accordance with one aspect of the present invention. The electric motor 20 has a coil array 22 and a magnet array 24. Electric current is supplied to the coils 26 of the coil array 22. The current interacts with 25 the magnetic flux of the magnets of the magnet array 24 to generate forces between the coil array 22 and the magnet array 24. The forces move and position the magnet array 24 relative to the coil array 22. The present invention teaches the levels of current to be applied to the coils 26 to achieve three degree of freedom control of the electric planar motor 20.

As shown in FIG. 1, a surface of the coil array 22 is in proximity to an opposing surface of the magnet array 24 during operation of the electric planar motor 20. Preferably, the opposing faces of the coil and magnet arrays 22, 24 are separated by approximately several millimeters or less during operation. One or more air bearings (not shown) may be 5 provided to separate the coil array 22 from the magnet array 24. The air bearings constrain the moving part in three degrees of freedom and allow it to move in the other three degrees of freedom. Other types of bearings, such as magnetic bearings, may be utilized. Construction and usage of an air bearing are known to those skilled in the art. For example, the '571 patent teaches an air bearing adaptable for use in the present invention.

When one or more air bearings separate the coil array 22 and the magnet array 24 relative to each other, the coil array 22 and/or the magnet array 24 may be potted with any suitable material such as epoxy or may be covered with a flat plate made of, for example, ceramic, composite, or metal, to form generally flat surfaces. The generally flat surfaces improve performance of the air bearing in separating or levitating the coil array 22 and magnet array 24 relative to each other.

Coils 26 of the coil array 22 are periodically distributed in X (first) direction and Y (second) directions. The coil array 22 has a first coil period 28 in the X direction defined as the distance from the center of one coil to the center of an adjacent coil along the X direction. The coil array 22 further has a second coil period 30 in the Y direction defined as the distance from the center of one coil to the center of an adjacent coil along the Y direction. The coil period 28 in the X direction is preferably approximately equal to the coil period 30 in the Y direction.

As shown in FIG. 1, each coil 26 in the coil array 22 has approximately the same shape and size. Although the coils 26 having approximately the same shape and size are preferred, the coils of the coil array 22 may have varying shapes and/or sizes. Each coil 26 preferably covers as much of an area of one coil period in both the X and Y directions as possible in order to maximize the force generated from the interaction between the magnet array 24 and the coil array 26 and thus minimize the coil power input necessary to achieve a desired amount of force. A rectangular profile of the coil 26 maximizes the area occupied by each coil 26 within the area defined by the coil periods 28, 30. As is evident, when the periods 28 and 30 are approximately equal, the profile of the coil 26 approximates a square.

Each coil 26 may be disposed about a magnetically impermeable post 32. In contrast, a magnetically permeable post would distort a magnetic field created by the magnet array 24, reduce the motor's force constant, and cause a significant force ripple.

A backing panel 34 may be attached to surface or side of the coil array 22 that is opposite the magnet array 24. The backing panel 34 may comprise a magnetically permeable material such as iron or may comprise a magnetically impermeable material such as plastic or ceramic. A magnetically permeable backing panel 34 increases the permanent magnetic flux through the coils and thus increases the performance of the electric planar motor 20.

As shown in FIG. 1, the coil array 22 has a first dimension 36 in the X direction and a second dimension 38 in the Y direction. Also, the magnet array has a first dimension 40 in the X direction and a second dimension 42 in the Y direction. As is evident, the first coil array dimension 36 is larger than the first magnet array dimension 40 and second coil array dimension 38 is larger than the second magnet array dimension 42.

Figure 2:
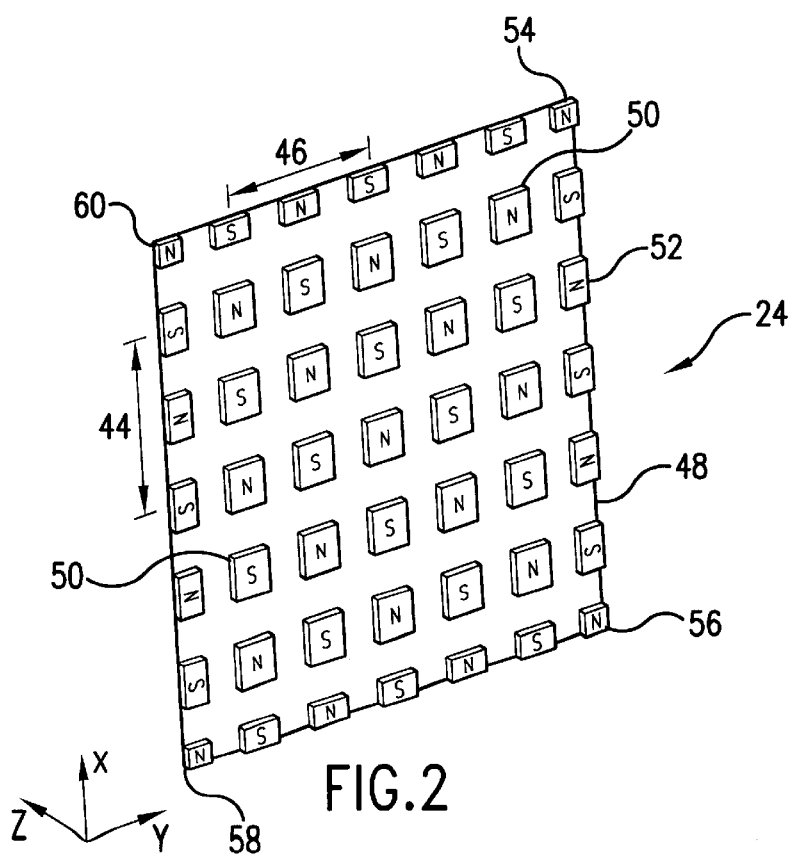
FIG. 2 shows a perspective view of a magnet array of the moving magnet electric motor of FIG. 1.

FIG. 2 is a perspective view of the magnet array 24, illustrating the surface or side of the magnet array 24 which faces the coil array 22 during operation of the electric planar motor 20.

Similar to the coils of the coil array 22, magnets in the magnet array 24 are also periodically distributed in two directions. The magnet array has a first magnet period 44 in the X direction defined as the distance from the center of one magnet to the center of the next magnet having the same polarity along the X direction. The magnet array 24 further has a second magnet period 46 in the Y direction distance from the center of one magnet to the center of the next magnet having the same polarity along the Y direction. The magnets of magnet array 24 are magnetized in the Z direction.

The magnet periods 44, 46 of the magnet array 24 in the X and Y directions are related to the periods 28, 30 of the coil array 22 in the X and Y directions, respectively. Specifically, the first magnet period 44 in the X direction is preferably four-thirds of the first coil period 28 in the X direction. Further, the second magnet period 46 in the Y direction is preferably four-thirds of a second coil period 30 in the Y direction. More generally, the coil periods 28, 30 are $(4n-1)/4$ times the respective magnet periods 44, 46, where n is an integer which is preferably greater than or equal to 1. Thus, when the coil periods 28, 30 in the X and Y directions are approximately equal, the magnet periods 44, 46 in the X and Y directions are also approximately equal.

The magnets are preferably attached to a magnetically permeable backing 48. The magnetically permeable backing 48 completes flux paths between adjacent magnets of opposite polarities to increase the magnetic flux of each polarity, as will be described in more detail below.

Preferably, the magnets in the magnet array 24 alternate in polarity in both the X and the Y directions such that the magnets along any diagonals of the X and the Y directions are of the same polarity. The interior magnets 50 in the magnet array 24 preferably have the same magnetic flux. In contrast, non-corner edge magnets 52 and corner magnets 54, 56, 58, 60 of the magnet array 24 have a fraction of the magnetic flux of the interior magnets 50. For example, the non-corner edge magnets 52 of the magnet array 24 have approximately one-half the magnetic flux of the interior magnet 50. The corner magnets 54, 56, 58, 60 have approximately one-quarter the flux of the interior magnets 50. The edge and corner magnets may have any other suitable fractional magnetic fluxes relative to the magnetic fluxes of the interior magnets 50. The fractional fluxes for the non-corner edge magnets 52 and for the corner magnets 54, 56, 58, 60 complete flux paths with each other and with the interior magnets 50 while simultaneously minimizing fringe magnetic fields at the edges of the magnet array 24. Without the fractional magnetic fluxes of the edge and corner magnets, the fringe magnetic fields at the magnet array edges may otherwise degrade performance of the moving magnet electric motor.

Other types and arrangements of the magnets may also be used in the control method of the present invention. For example, wedge magnets may be utilized to facilitate the completion of the magnetic fields. Magnet arrays using wedge magnets are disclosed in, for example, U.S. Pat. No. 6,188,147, entitled "Wedge and Transverse Magnet Arrays", issued on Feb. 13, 2001, by Hazelton et al. and copending application Ser. No. 09/309,721, entitled "Planar Electric Motor and Positioning Device Having Transverse Magnets", filed on May 11, 1999, both of which are incorporated herein by reference.

The moving magnet planar motor 20 is generally preferable to a moving coil electric motor because the moving magnet array 24 does not require electrical current connections or hoses to carry cooling fluids. Wires and hoses connected to a coil array of the moving coil electric motor may interfere with the motion of the coil array with respect to the magnet array in a moving coil planar motor. Nonetheless, the method of controlling a electric planar motor in three degrees of freedom of the present invention as described below may also be applied to a moving coil planar motor, such as shown in FIGS. 3 and 4.

Figure 3:
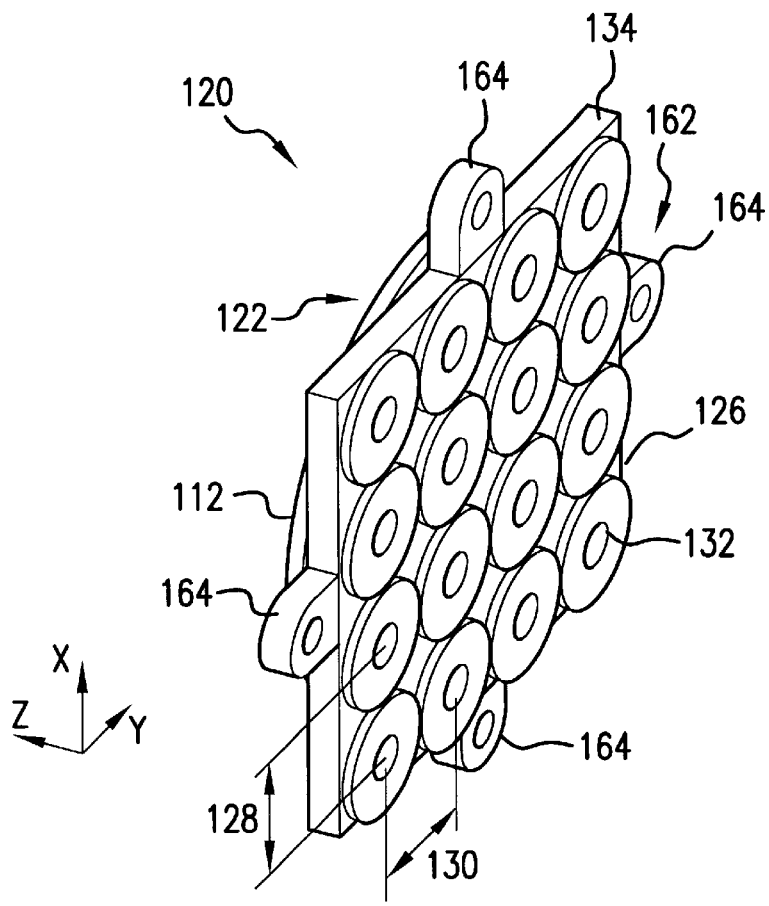
FIG. 3 shows a perspective view of a coil array of a moving coil electric motor in accordance with another aspect of the present invention.
Figure 4:
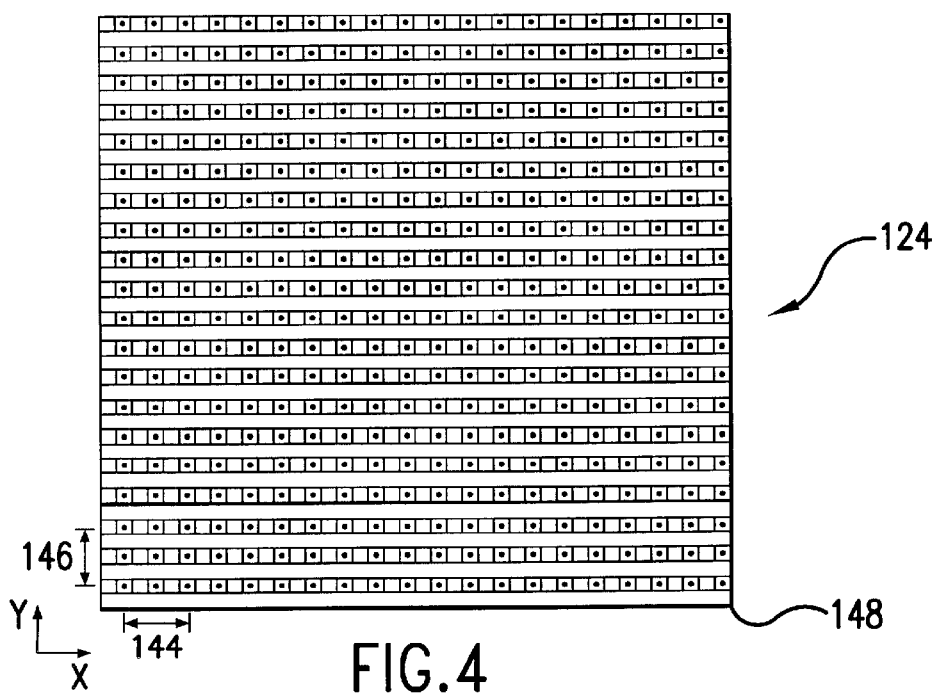
FIG. 4 shows a plane view of a magnet array for use with the coil array of the moving coil electric motor shown in FIG. 3.

FIGS. 3 and 4 show, respectively, a coil array 122 and a magnet array 124 of a moving coil planar motor 120 according to another aspect of the present invention. The coil array 122 is movable relative to the magnet array 124 by supplying electric current to one or more of the coils 126 of the coil array 122. The current interacts with the magnetic flux of the magnets of the magnet array 124 to generate forces between the coil array 122 and the magnet array 124. The forces move and position the coil array 122 relative to the magnet array 120.

A face or side 162 of the coil array 122 is in close proximity to the face or side of the magnet array 124 shown in FIG. 4 during operation of the electric planar motor 120. Preferably, the opposing faces of the coil and magnet arrays 122, 124 are separated by approximately several millimeters or less during operation. One or more air bearings 164, as described above with reference to the moving magnet motor 20, may be provided to separate the coil array 22 from the magnet array 24. In addition, when one or more air bearings 164 separate the coil array 122 and the magnet array 124 relative to each other, the coil array 122 and/or the magnet array 124 may be potted or covered with a flat plate, as described above, to form generally flat surfaces. The generally flat surfaces improve performance of the air bearing in separating or levitating the coil array 122 and magnet array 124 relative to each other.

Coils 126 of the coil array 122 are periodically distributed in X (first) direction and Y (second) directions. The coil array 122 has a first coil period 128 in the X direction defined as the distance from the center of one coil to the center of an adjacent coil along the X direction. The coil array 122 further has a second coil period 130 in the Y direction defined as the distance from the center of one coil to the center of an adjacent coil along the Y direction. The coil period 128 in the X direction is preferably approximately equal to the coil period 130 in the Y direction.

Similar to the coils 26 of the coil array 22 of the moving magnet planar motor 20, each coil 126 may be disposed about a magnetically impermeable post 132. Further, a backing panel 134 may be attached to one surface or side of the coil array 122. Backing panel 134 is preferably permeable.

The magnets are preferably attached to a magnetically permeable backing 148. The magnetically permeable backing 148 completes flux paths between adjacent magnets of opposite polarities to increase the magnetic flux of each polarity, as will be described in more detail below.

As shown in FIG. 4, the magnets in the magnet array 124 are also periodically distributed in the X and Y directions. The magnet array has a first magnet period 144 in the X direction defined as the distance from the center of one magnet to the center of the next magnet having the same polarity along the X direction. The magnet array 124 further has a second magnet period 146 in the Y direction distance from the center of one magnet to the center of the next magnet having the same polarity along the Y direction.

Preferably, the magnets in the magnet array 124 alternate in polarity in both the X and the Y directions such that the magnets along any diagonals of the X and the Y directions are of the same polarity. The first magnet period 144 in the X direction is preferably approximately four-thirds of the first coil period 128 in the X direction. More generally, the first coil period 128 is computed as (4n−1)/4 times the first magnet period 144, where n is an integer which is preferably greater than or equal to 1. Further, the second magnet period 146 in the Y direction is preferably four-thirds of a second coil period 130 in the Y direction. Thus, when the coil periods 128, 130 in the X and Y directions are approximately equal, the magnet periods 144, 146 in the X and Y directions are also approximately equal.

In the moving coil planar motor 120, the total number of coils in the coil array 122 is preferably a multiple of 4. As will be described below with reference to FIG. 5, the principles of operation for control and movement in the X and Y directions use four adjacent, approximately identically shaped coils. Further, the principles of operation for control and movement in three degrees of freedom in the X and Y directions and rotation about the Z direction use two sets of four adjacent, approximately identically shaped coils.

The above-described planar motors 20, 120 are similar to those described in U.S. Pat. No. 6,208,045 issued on Mar. 27, 2001 by Hazelton et al., the entirety of which is incorporated herein by reference.

Control and Generation of Forces Between Coil and Magnet Arrays

The interactions of currents in the coils and magnetic flux of the magnets in the magnet array to generate forces between the magnet array and the coil array will now be described. Although the following description is in terms of a moving magnet electric motor 20, as is preferred, similar concepts and principles may be used in a moving coil electric motor 120.

The generation of forces to achieve motion of the magnet array relative to the stationary coil array in the X and Y directions and rotation about the Z direction is described with reference to FIGS. 5 and 6. A general qualitative description of the control of the moving magnet motor in three degrees of freedom will be described with reference to FIG. 5. A more detailed quantitative description of the control of the moving magnet motor in three degrees of freedom with torque control will be described with reference to FIG. 6.

Figure 5:
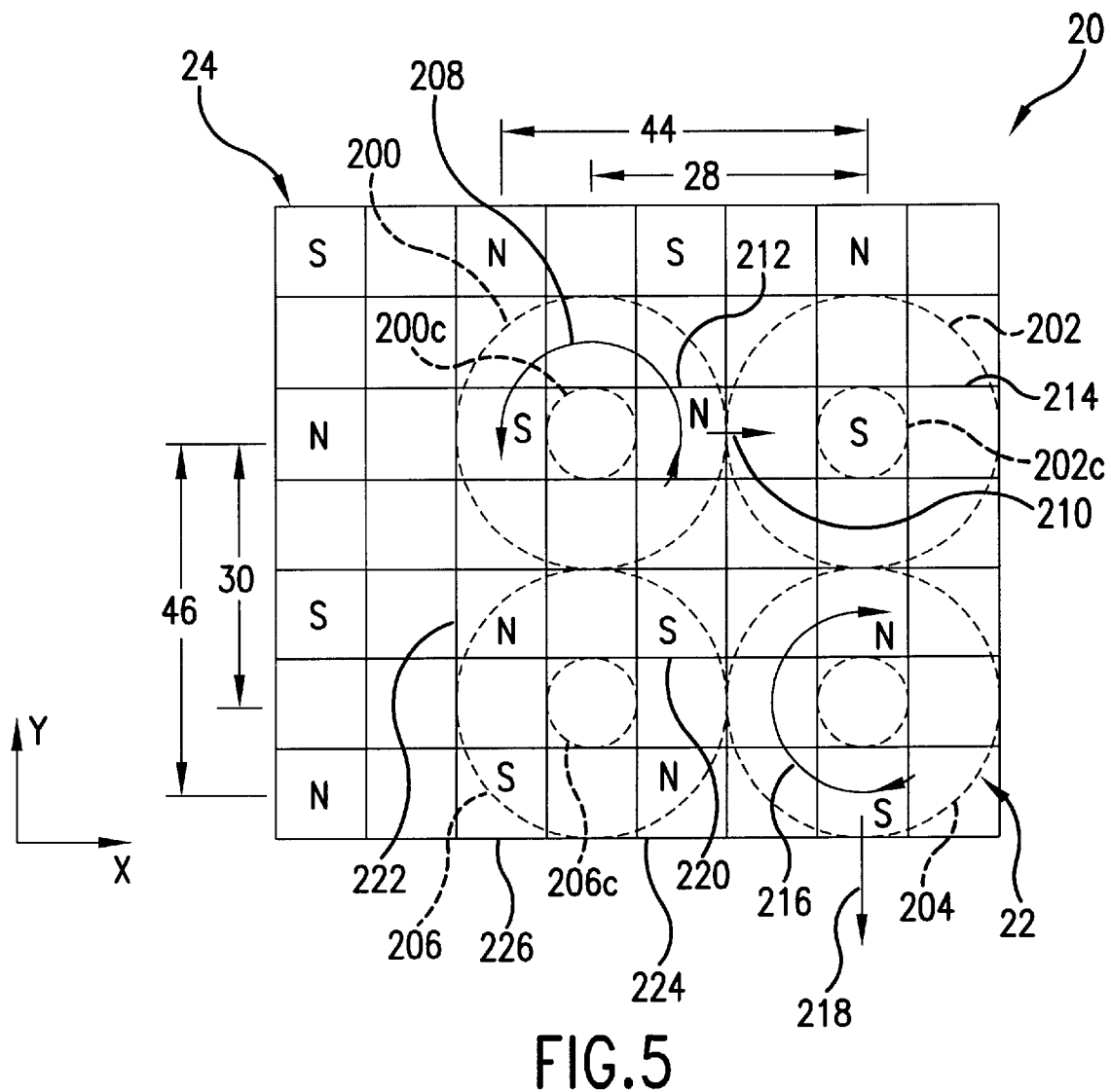
FIG. 5 is a schematic illustrating a method to achieve force and motion of a portion of magnet array relative to a portion of coil array in X and Y directions and rotation about the Z direction in accordance with a method of the present invention.
Figure 6:
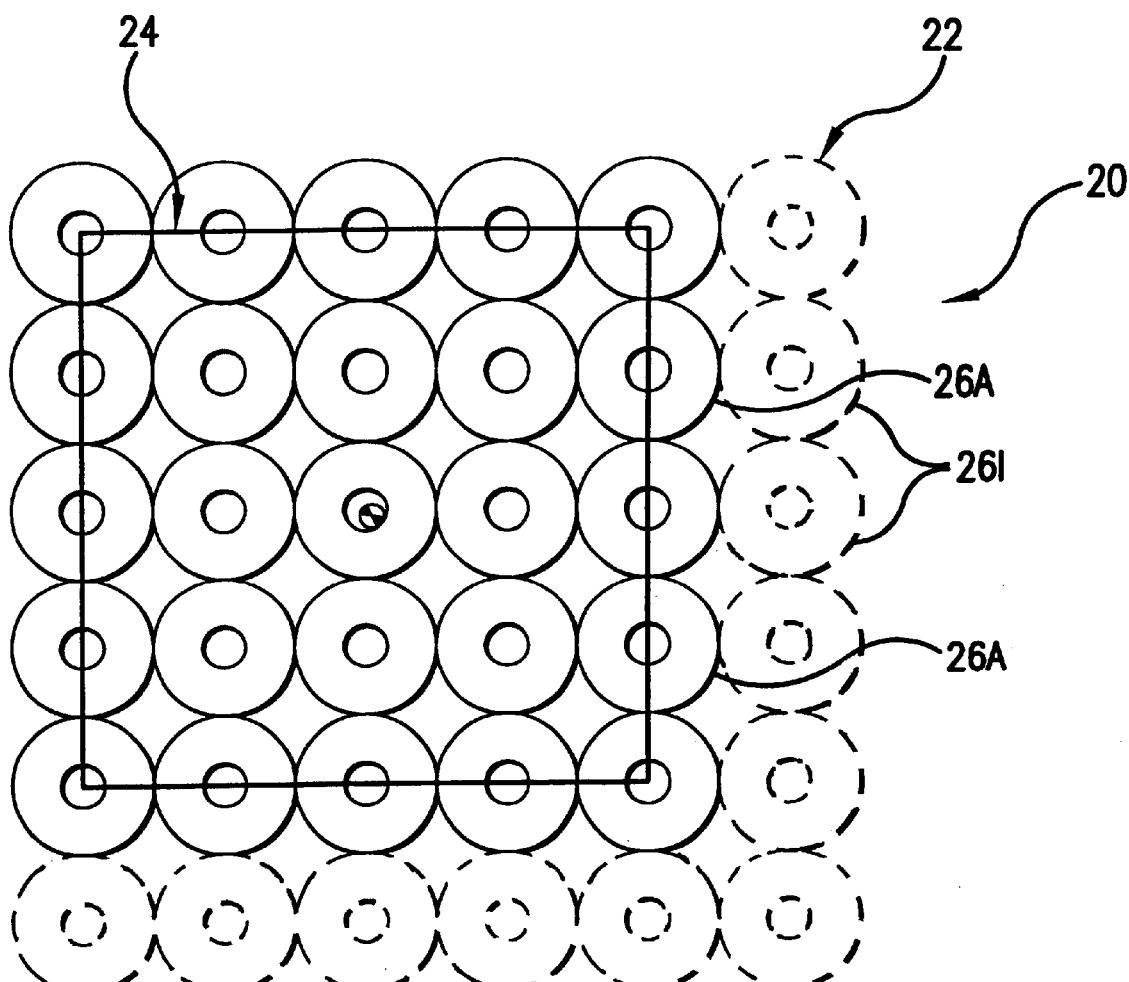
FIG. 6 shows a partial plane view of the magnet and coils array illustrating active and inactive coils in a commutation method of the present invention.

FIG. 5 is a schematic representation of a section of the moving magnet electric motor 20. FIG. 5 shows a sub-array of the magnet array 24 and a set of four coils 200, 202, 204, 206 which are part of the coil array 22. In the embodiment shown in FIG. 5, each coil has first and second periods 28, 30 in the X and Y directions, respectively, approximately equaling three-fourths of first and second magnet periods 44, 46 respectively.

By appropriately commutating currents flowing in the coils 200, 202, 204, 206, force is generated between the coil array 22 and the magnet array 24. For example, in the relative positions of the coil and magnet arrays 22, 24 shown in FIG. 5, a counter-clockwise current 208 supplied through coil 200 interacts with the magnetic field of the magnets covered by the coil 200 to exert a force on the coil array 22 in a positive X direction as indicated by arrow 210, according to the left-hand rule and the Lorentz force laws. An equal and opposite force acts on the magnet array 24.

In a two-phase commutation scheme to generate a force on the coil array 22 in the positive X direction 210, two coils 200, 202 are commutated as magnet array 24 moves in the X direction. For example, in the relative positions of the coil and magnet arrays 22, 24 shown in FIG. 5, the counter-clockwise current 208 supplied through the coil 200 is at a maximum while no current is supplied through the coil 202. As the coil 200 moves in the positive X direction 210 and its center 200c approaches the next magnetic pole 212, the counter-clockwise current 208 supplied through the coil 200 approaches zero. As the coil 200 moves in the positive X direction 210 relative to the magnet array 24, the coil 202 also moves in the direction 210, and its center 202c moves toward location 214.

During this motion, to maintain the force in the positive X direction 210, a counter-clockwise current is supplied through the coil 202. As the counter-clockwise current in the coil 202 increases to its maximum the current 208 simultaneously decreases. When the center 202c of coil 202 coincides with the location 214, the current in the coil 202 will be at its maximum and the counter-clockwise current 208 will be at zero. In this way, a constant force is maintained between the coil and magnet array 22, 24.

Similarly, when magnet array 24 moves in the Y direction, current can be commutated to flow in clockwise direction 216 through the coil 204 to generate a force on the coil array 22 in a negative Y direction 218. As in the movement in the positive X direction 210, the coils 202, 204 may be commutated in a similar fashion as the coils 200, 202 to provide a continuous force in the negative Y direction 218. As with the coils 200, 202, the commutation of the coils 202, 204 is a two phase commutation.

With respect to coil 206, magnets 220, 222, 224, 226 are symmetrically positioned about its center 206c. When the coil 206 is symmetric about its center 206c and the coil center 206c in centrally disposed over the magnets 220, 222, 224, 226, the forces generated by the interaction between the current through the coil 206 and the magnetic fields of the magnets 220, 222, 224, 226 are cancelled. Thus, unlike the other three coils 200, 202, 204, the coil 206 cannot generate a force between the coil and magnet arrays 22, 24 in the position as shown in FIG. 5.

Only a few examples of commutation have been described. Clearly, as will be appreciated by those skilled in the art, many other commutations may be applied to the coils 200, 202, 204, 206 and the other coils in the coil array 22 to achieve forces and motions in X and Y directions. By providing at least two sets of four coils and by simultaneously generating forces in both the X and Y directions, such as in the positive X and negative Y directions 210, 218, the electric motor 20 can also be controlled to rotate and position the moving magnet array 24 relative to the stationary coil array 22 about the Z direction.

Torque Control

A more detailed quantitative description of the control of the moving magnet motor in three degrees of freedom with torque control will now be described with reference to FIG. 6. FIG. 6 shows active coils 26A and inactive coils 261 of the coil array 22 by showing the inactive coils 261 in phantom. The active coils 26A are those coils to which current commutation schemes are applied and whose current interacts with the magnetic field of the magnets of the magnet array 24. The inactive coils 261 are not within the magnetic field of the magnets of the magnet array 24 and current is not applied to them. As shown in FIG. 6, the active coils 26A include coils at least a portion of which is covered by the moving magnet array. The current supplied through the active coils 26A interact with the magnetic field of the magnet array 24 to generate a force between the magnet and coil arrays 22, 24. Thus, all coils wholly or partially within the magnetic field of the magnet array 24 are utilized to generate forces in the X, Y and θ directions.

The utilization of coils only partially within the magnetic field of the magnet array 24 maximizes the forces generated. Further, it allows the utilization of a smaller magnet array 24. Specifically, the magnet array 24 needs to only cover the size of two by four coils or a total of eight coils in order to control the magnet array 24 in three degrees of freedom. This is an over 46% decrease of the three by five coils or a total of fifteen coils of the magnet array of conventional electric motors that utilize only coils which are completely within the magnetic field of the magnet array 24 in order to achieve control in three degrees of freedom.

In the following derivation of the coil current commutation scheme to control the moving magnet motor 20 in three degrees of freedom, parameters expressed in upper case letters, for example, T, $K_{fx}$, $f_x$, apply to the entire motor whereas parameters expressed in lower case letters, such as t, $k_{fx}$, $f_x$, apply to individual coils. In addition, (x, y) represents the position of each active coil 26A relative to a chosen origin point of the moving magnet array 24. The origin can be any point on the magnet array 24.

First, the "open loop" commutation scheme and the resultant torque generated are determined. The open loop commutation scheme does not include torque control. After the open loop commutation scheme and the resultant torque generated are determined, torque control is determined and added to compensate for the open loop resultant torque to achieve accurate control and positioning of the moving magnet array or the stage.

As noted above, to achieve three degrees of freedom control of the moving magnet motor, only forces in the X and Y directions are necessary. As is evident, forces in the X and Y directions provides linear control and movement in the X and Y directions. Further, by simultaneously generating forces in the X and Y directions, force and motion in the third direction θ, i.e. rotation about the Z direction, can be achieved. To generate forces in the third direction θ, at least a total of two sets of four coils must be within the magnet field of the magnet array. Thus, the minimum area of the magnet array is an area equivalent to the area covered by eight coils.

Torque Resulting From Open Loop Commutation

The X and Y current amplitudes $I_x$ and $I_y$ for the moving magnet stage are given by:

$$I_x = \frac{R_x}{K_{xy}}$$

$$I_y = \frac{R_y}{K_{xy}}$$

where:

$I_x$ and $I_y$ are the amplitudes of the current for the stage to achieve the desired forces in the X and Y directions, respectively;

$R_x$ and $R_y$ are the desired forces in the X and Y directions, respectively; and $K_{fx}$ and $K_{fy}$ are the total force constants for the stage in the X and Y directions, respectively, which are functions of physical parameters of the stage, such as the strength of the magnet fluxes of the magnets, the number of turns of the wires of each coil, and other physical parameters, and which can be calculated from the physical parameters, empirically determined, or determined by simulation.

The ideal commutation waveforms $c_x$ and $c_y$ for each coil in the X and Y directions, respectively, are sinusoidal. However, other waveform shapes such as square and/or triangular, may be utilized. Thus, the current i applied to each coil is given by:

$$i = I_x \cdot c_x + I_y \cdot c_y$$

where:

$$c_x = \cos(x) \cdot \sin(y)$$

$$c_y = \sin(x) \cdot \cos(y)$$

and where $c_x$ and $c_y$ are the commutation waveforms for each coil in the X and Y directions, respectively; and x and y are the position of each coil relative to the origin.

Further, each coil produces a torque, t, given by:

$$t = r \times f = \begin{pmatrix} x \\ y \end{pmatrix} \times k_f \cdot i = i(k_{fx} \cdot y - k_{fy} \cdot x)$$

where:

$k_{fx}$ and $k_{fy}$ are the force constants of each coil in the X and Y directions; and i is the current supplied to the coil.

Thus, the total forces $F_x$ and $F_y$ in the X and Y directions, respectively, and the torque T produced by the stage are given by:

$$F_x = \sum (k_{fx} \cdot i) \quad (1)$$
$$F_y = \sum (k_{fy} \cdot i)$$
$$T = \sum (k_{fx} \cdot y \cdot i - k_{fy} \cdot x \cdot i)$$
$$= f(X_s, Y_s)F_x + g(X_s, Y_s)F_y$$

where:

$F_x$ and $F_y$ are the total forces produced by the stage in the X and Y directions which are equal to $R_x$ and $R_y$, the desired forces in the X and Y directions, respectively;

$X_s$ and $Y_s$ represent the position of the stage in the X and Y directions, respectively, relative to a stationary origin;

T is the torque caused by the forces $F_x$ and $F_y$ that do not act through the center of gravity of the stage and which depends on both the currents i in the coils and the position of the stage, $X_s$ and $Y_s$; and f and g are functions that are constant for a given stage and can be determined experimentally or by simulation.

Torque Control

The above open loop equations give the total resultant torque exerted on the stage when the commutation scheme does not include torque control. To compensate for the resultant torque, the commutation scheme is modified in order to achieve accurate control and positioning of the moving magnet array or the stage. To compensate for the resultant total torque, the coil currents are adjusted such that some coils produce more force and some produce less. Applying the adjusted currents to the coils using the commutation scheme with torque control, the total force exerted on the magnet array remains the same while the total torque exerted on the magnet array becomes a desired value, which is often zero or nearly zero.

The torque constant $k_t$ for each coil is defined as:

$$k_t = \frac{t}{i} = k_{fx} \cdot y - k_{fy} \cdot x$$

In general, the torque constants $k_t$ for the coils near the center of gravity of the stage are relatively small because the forces attributable those coils have short moment arms. Further, the torque constant $k_t$ for some other coils are also relatively small because those other coils are in positions such that they do not generate a large amount of force.

The coil currents i are adjusted such that the resultant total torque is a desired value. Defining dt as the torque correction produced by each coil as a result of a change in the coil current di, the sum of the correction torques dt and the open loop torque T should be equal to the desired torque $R_\theta$:

$$T + \Sigma dt = R_\theta$$

$$\Sigma dt = R_\theta - T$$

where:

dt is the correction torque produced by each coil; and $\Sigma$ dt is the sum of the torque corrections produced by the coils.

Because each dt is created by a change in the coil current di, the change in the coil current di is given by:

$$di = \frac{dt}{k_t}$$

Assuming that each coil should produce a correction torque dt that is proportional to its torque constant $k_t$, the correction torque dt for each coil is given by:

$$dt = \alpha \cdot |k_t|$$

where:

a is a correction torque constant for all the coils.

The absolute value of $k_t$ is used because some coils have a negative $k_t$ (i.e. $k_t < 0$), but all coils should produce correction torques dt in the same direction.

The value of constant α can be determined from:

$$\Sigma dt = R_\theta - T$$

Because the constant α is the same for each coil, the sum of the correction torques can be written as $$\Sigma dt = \alpha \Sigma |k_t|$$

Combining the above two equations and solving for a gives:

$$a = \frac{R_\theta - T}{\Sigma |k_t|}$$

Thus, the constant α depends on the position of the stage and the total force $F_x$ and $F_y$ produced by the stage in the X and Y directions, respectively and $R_\theta$.

The value of constant α can be determined if the functions f and g of equation (1) are determined, such as experimentally, by simulation and/or from lookup tables or equations, and the position of the stage as well as the desired forces $R_x$ and $R_y$ and the desired torque $R_\theta$, are known.

In addition, the correction current di for each coil can be determined in terms of α, because $$dt = \alpha |k_t|$$

and $$dt = k_t \cdot di$$

solving for the correction current di:

$$di = a \frac{|k_t|}{k_t}$$

-continued $$di = \frac{R_\theta - T}{\sum |k_t|} \cdot \frac{|k_t|}{k_t}$$

In the above equation, the first multiplicand ($R_\Theta-T/\Sigma|k_t|$) is the constant α, which is the same for every coil. The second multiplicand ($|k_t|/k_t$) is simply the sign +1, 0, or −1 of $k_t$ that ensures that all the coils produce correction torques dt in the same direction and which must be evaluated separately for each coil covered by the moving magnet array. However, the sign of $k_t$ only depends on the position of the stage, which is known, and on the force constants $K_x$ and $K_y$ which may be determined off-line and stored in a look-up table or calculated from equations. Further, where a coil is in a position that does not generate a force relative to the magnet array or that generates a force through the center of gravity of the magnet array, the correction current di is 0 for that coil as no torque is generated thereby.

The above-described torque control commutation scheme also desirably produces little or no force ripple as a result of adding or subtracting the change in coil current di term to each coil. This is partly due to the fact that the moving magnet array is symmetrical such that at every position of the stage, half of the force in the X direction is created by the positive Y half of the stage where the values of the current change di terms are positive and half by the negative Y half of the stage where the values of the current change di terms are negative. Thus, any change in force created by one coil will be offset by a negative change in force of approximately the same amplitude created by another coil on the opposite side of the stage. Nonetheless, force ripples may result from such factors as the imperfect modeling of the force constants $k_t$, the shape of the magnets not being perfectly symmetrical and/or the commutation waveforms not being perfectly sinusoidal.

Figure 7:
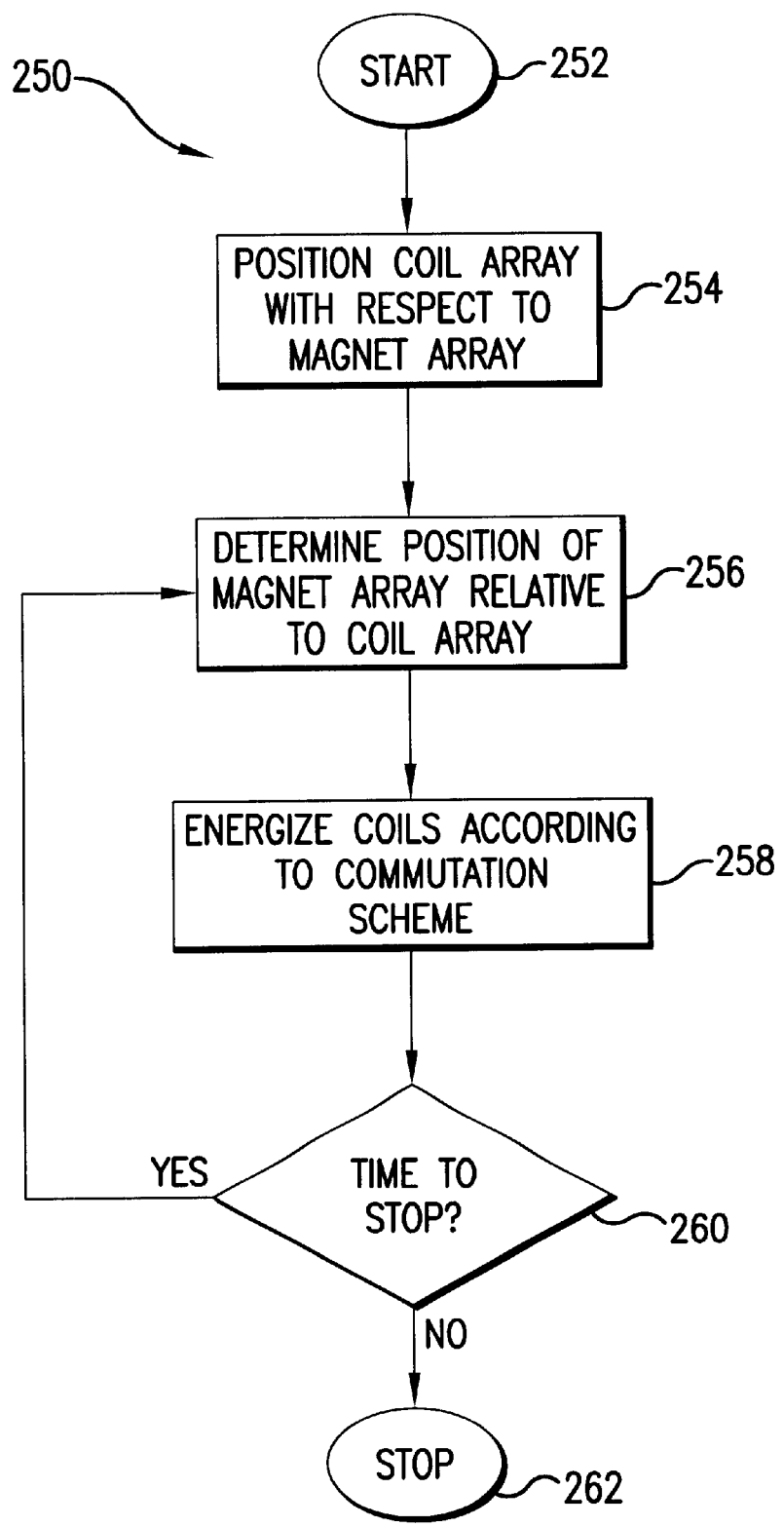
FIG. 7 is a flow chart of a process to achieve control and motion of a planar motor in three degrees of freedom in accordance with the present invention.

FIG. 7 is a flow chart illustrating the process or method 250 of achieving motion of the magnet array 24 with respect to the coil array 22. The method or process 250 begins at a start procedure 252. Procedure 254 positions the magnet array 24 relative to the coil array 22. Procedure 256 determines the position of the magnet array 24 relative to the coil array 22 with a measurement device, such as an interferometer. Procedure 258 energizes the active coils of the coil array 22 according to the commutation scheme as determined with the method described above. Procedure 260 determines whether the control system should stop. If no stop condition exists, the method 250 returns to procedure 256 to determine the position of the magnet array 24 relative to the coil array 22. If it is time to stop the motor, the method 250 terminates at a procedure 262, which de-energizes all of the coils.

Procedure 258 controls the relative forces between a portion of the coil array and the moving magnet array by selectively applying predetermined currents to the appropriate coils such that the appropriate coils interact with the magnetic fields associated with the magnets in the magnet array and generate forces.

As noted, the above-described method of controlling a moving magnet planar electric motor to position the platform in three-degrees of freedom may be utilized with a moving coil electric motor. However, the commutation scheme is simpler because all the coils of the moving coil array are within the magnet field of the magnet array and no coils are partially within the magnet field. Thus, the forces generated between the coil and magnet arrays act through the center of the coils. Furthermore, the coils are always in the same position relative to the center of gravity of the moving coil array or stage. Therefore, torque control is straightforward in a moving coil planar electric motor.

Figure 8:
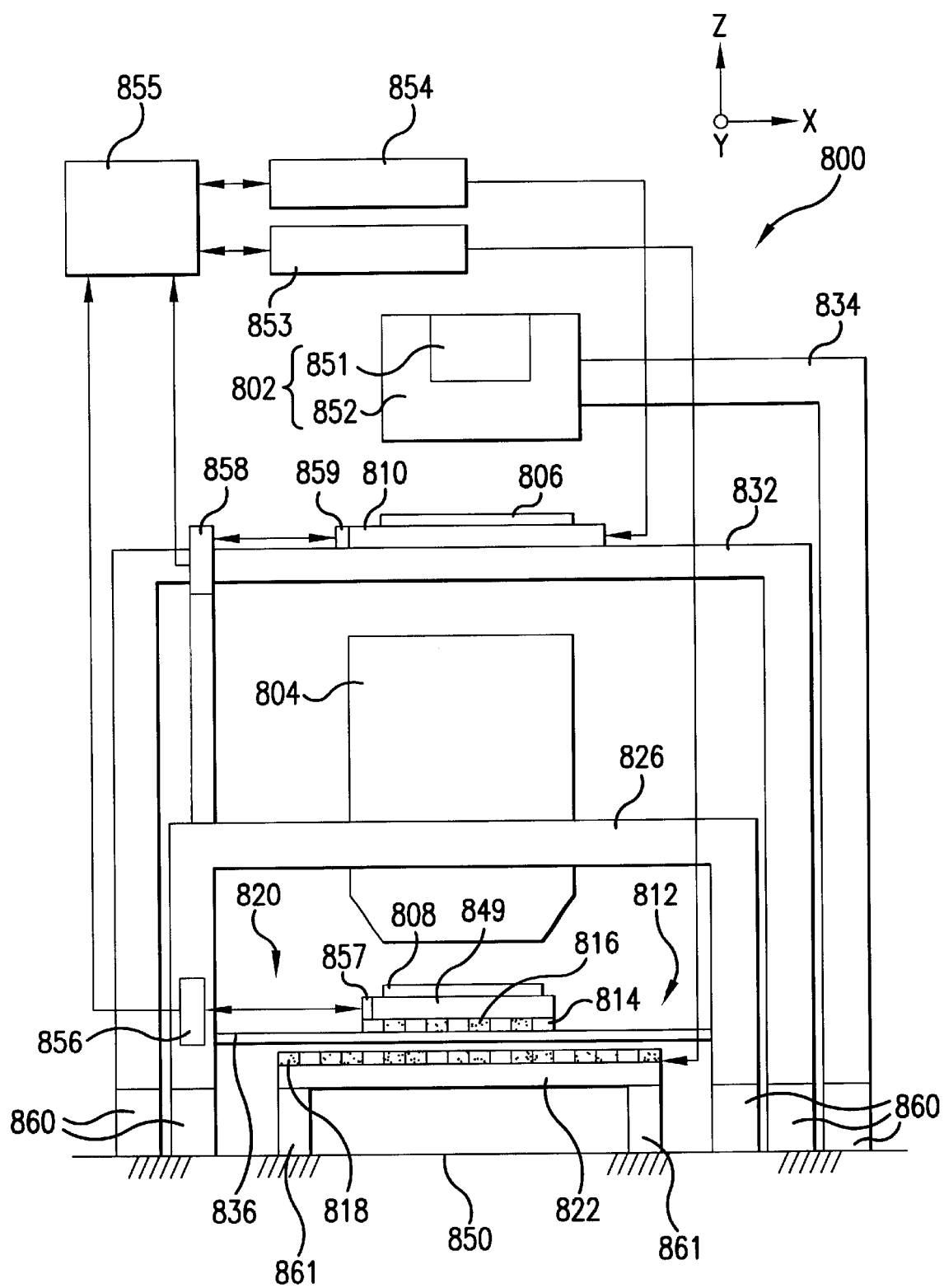
FIG. 8 shows a schematic of a partial side view of an example of a photolithography system using the electric motor of the present invention.

The electric motors of the present invention may be used with a lithography system such as shown and described in, for example, the '118 patent referenced above. FIG. 8 shows a side view of an example of a photolithography system 800 using the electric motor 812 of the present invention. Although the photolithography system 800 is described as utilizing a moving magnet electric motor 812, the photolithography system may be adapted to utilize a moving coil electric motor or other variations of the moving magnet electric motor.

The photolithography system (exposure apparatus) 800 generally comprises an illumination system 802 (irradiation apparatus), a first frame 834, a reticle stage assembly 810, a second frame 832, the optical assembly (lens assembly) 804, a third frame 826, and a wafer stage assembly 820. A moving magnet electric motor 812 provided herein can be used as a part of the wafer stage assembly 820. Alternately, with the disclosure provided herein, the moving magnet electric motor 812 can be modified for use as a part of the reticle stage assembly 810.

The lithography system 800 is particularly useful as a lithographic device that transfers a pattern (not shown) of an integrated circuit from a reticle 806 onto a substrate such as a semiconductor wafer 808. The lithography system 800 mounts to the mounting base 850, e.g., the ground, a base, or floor or some other supporting structure.

The first frame 834 supports the illumination system 802 above the mounting base 850. The second frame 832 supports the reticle stage assembly 810 above the mounting base 850. The third frame 826 supports the optical assembly 804 above the mounting base 850. The frames 834, 832, and 826 are coupled to the mounting base 850 by vibration damping devices 860. The design of these frames 834, 832, and 826 can be varied to suit the design requirements for the rest of the lithography system 800.

The illumination system includes an illumination source 851 and an illumination optical assembly 852. The illumination source 851 emits a beam (irradiation) of light energy. The illumination optical assembly 852 guides the beam of light energy from the illumination source 851 to the optical assembly 804. The beam illuminates selectively different potions of the reticle 806 and exposes the wafer 808. In FIG. 8, the illumination system 802 is illustrated as being supported above the reticle stage assembly 810. However, the illumination system 802 is secured to one of the sides of the frames and the energy beam from the illumination source 851 is directed to above the reticle stage assembly 810 with the illumination optical assembly 852.

The optical assembly 804 projects and/or focuses the light passing through the reticle 806 to the wafer 808. Depending upon the design of the lithography system 800, the optical assembly 804 can magnify or reduce the image illuminated on the reticle 806.

The reticle stage assembly 810 holds and positions the reticle 806 relative to the optical assembly 804 and the wafer 808. Similarly, the wafer stage assembly 820 holds and positions the wafer 808 with respect to the projected image of the illuminated portions of the reticle 806 in the operation area. In FIG. 8, the wafer stage assembly 820 utilizes the moving magnet electric motor 812 having features of the present invention. Depending upon the design, the lithography system 800 can also include additional wafer stage assemblies 820 to increase the throughput of the lithography system 800.

The wafer 808 is held by vacuum suction on a wafer holder 849 that is supported on the wafer stage assembly 820. The wafer stage assembly 820 is structured so that it can be moved in several (e.g., three to six) degrees of freedom by a planar motor (the moving magnet electric motor 812) under precision control by a wafer stage driver 853 and system controller 855, to position the wafer 808 at a desired position and orientation, and to move the wafer 808 relative to the projected image of the illuminated portions of the reticle 806 in the operation area. The moving magnet electric motor 812 comprises a moving magnet array 814 and a fixed coil array 818. The moving magnet array 814 is connected to the wafer holder 849 and supported by air bearings 816 on a plate 836. The plate 836 is positioned between the moving magnet array 814 and the fixed coil array 818 and connected to the third frame 826. The plate 826 may be made of non-magnetic materials, for example, carbon fiber plastics, ceramics such as Zerodur ceramics, $Al_2O_3$ ceramics, and like materials that do not impair the magnetic flux generated by the magnet array 814. The plate 836 may be formed with a thick honeycomb structure or other types of reinforced structure to prevent it from bending. The coil array 818 is attached to the backing panel 822. The backing panel 822 is rigidly supported on the mounting base 850 on support 861. However, the baking panel 822 may be supported on the mounting base 850 by the vibration damping device 860, same as the frames 834, 832, and 826.

The lithography system 800 includes a first measuring system that detects the position of the wafer holder 849 (wafer 808) relative to the optical assembly 804 as a reference structure at least along the X, Y axis and about the Z (theta Z) axis. This information corresponds to the position of the magnet array 814 relative to the coil array 818. The first measuring system can utilize an interferometer system. In this embodiment, the first measuring system comprises a first interferometer block 856 supported on the third frame 826 and a first moving mirror 857 attached to the wafer holder 849. The first interferometer block 856 generates a pair of spaced apart laser beams (not shown) to the first moving mirror 857 and detects the beams reflected from the first moving mirror 857 to output the information of the position of the wafer 808 to the system controller 855. Further, the lithography system 800 includes a second measuring system that detects the position of the reticle stage assembly 810 (reticle 806) relative to the optical assembly 804 as a reference structure at least along the X, Y axis and about the Z (theta Z) axis. Somewhat similarly, the second measuring system comprises a second interferometer block 858 supported on the third frame 826 and a second moving mirror 859 attached to the reticle stage assembly 810. The second interferometer block 858 generated a pair of spaced apart laser beam (not shown) to the second moving mirror 859 and detects the beams reflected from the second moving mirror 859 to output the information of the position of the reticle 806 to the system controller 855.

The system controller 855 is connected to the first interferometer block 856, the second interferometer block 858, the wafer stage driver 853, and a reticle stage driver 854. The system controller 855 controls each of drivers 854 and 853 for the reticle stage assembly 810 and wafer stage assembly 820 based on the information of the positions outputted from the interferometer blocks 856 and 858 and the desired position of the reticle and the wafer stage assemblies. In this embodiment, the system controller 855 determines current to be applied to coils included in the coil array 818 of the electric motor 812, and outputs this information to the wafer stage driver 853. The wafer stage driver 853 is connected to each coil of the coil array 818 and drives the electric motor 812 in accordance with the information. Further, the system controller 855 determines a resultant torque between the magnet array 814 and the coil array 818 and the correction current to compensate for the resultant torque as mentioned above. The wafer stage driver 853 drives the electric motor 812 based on this information. As a result, the wafer 808 is positioned precisely in wide ranges.

There are a number of different types of photolithographic devices. For example, photography system 800 can be used as a scanning type photolithography system which exposes the pattern from reticle 806 onto wafer 808 with reticle 806 and wafer 808 moving synchronously. In a scanning type lithographic device, reticle 806 is moved perpendicular to an optical axis of lens assembly 804 by reticle stage assembly 810 and wafer 808 is moved perpendicular to an optical axis of lens assembly 804 by wafer stage assembly 820. Scanning of reticle 806 and wafer 808 occurs while reticle 806 and wafer 808 are moving synchronously.

Alternately, photolithography system 800 can be a step-and-repeat type photolithography system that exposes reticle 806 while reticle 806 and wafer 808 are stationary. In the step and repeat process, wafer 808 is in a constant position relative to reticle 806 and lens assembly 804 during the exposure of an individual field. Subsequently, between consecutive exposure steps, wafer 808 is consecutively moved by wafer stage assembly 820 perpendicular to the optical axis of lens assembly 804 so that the next field of semiconductor wafer 808 is brought into position relative to lens assembly 804 and reticle 806.

However, the use of photolithography system 800 provided herein is not limited to a photolithography system for a semiconductor manufacturing. Photolithography system 800, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a lens assembly. Additionally, the present invention provided herein can be used in other devices, including other semiconductor processing equipment, machine tools, metal cutting machines, and inspection machines.

The illumination source 851 can be g-line (436 nm), i-line (365 nm), KrF excimer laser (248 nm), ArF excimer laser (193 nm) and $F_2$ laser (157 nm). Alternatively, illumination source 851 can also use charged particle beams such as x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

With respect to lens assembly 804, when far ultra-violet rays such as the excimer laser is used, glass materials such as quartz and fluorite that transmit far ultra-violet rays is preferably used. When the $F_2$ type laser or x-ray is used, lens assembly 804 should preferably be either catadioptric or refractive (a reticle should also preferably be a reflective type), and when an electron beam is used, electron optics should preferably comprise electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No. 8-171054 published in the Official Gazette for Laid-Open Patent Applications and its counterpart U.S. Pat. No. 5,668,672, as well as Japan Patent Application Disclosure No. 10-20195 and its counterpart U.S. Pat. No. 5,835,275. In these cases, the reflecting optical device can be a catadioptric optical system incorporating a beam splitter and concave mirror. Japan Patent Application Disclosure No. 8-334695 published in the Official Gazette for Laid-Open Patent Applications and its counterpart U.S. Pat. No. 5,689,377 as well as Japan Patent Application Disclosure No. 10-3039 and its counterpart U.S. Pat. No. 873,606 (Application Date: Jun. 12, 1997) also use a reflecting-refracting type of optical system incorporating a concave mirror, etc., but without a beam splitter, and can also be employed with this invention. The disclosures in the above-mentioned U.S. patents, as well as the Japan patent applications published in the Official Gazette for Laid-Open Patent Applications are incorporated herein by reference.

Further, in photolithography systems, when linear motors (see U.S. Pat. Nos. 5,623,853 or 5,528,118) are used in a wafer stage or a reticle stage, the linear motors can be either an air levitation type employing air bearings or a magnetic levitation type using Lorentz force or reactance force. Additionally, the stage could move along a guide, or it could be a guideless type stage which uses no guide. The disclosures in U.S. Pat. Nos. 5,523,853 and 5,528,118 are incorporated herein by reference.

Alternately, one of the stages could be driven by a planar motor, which drives the stage by electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages as described above generates reaction forces which can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. The disclosures in U.S. Pat. Nos. 5,528,118 and 5,874,820 and Japanese Patent Application Disclosure No. 8-330224 are incorporated herein by reference.

As described above, a photolithography system according to the above described embodiments can be built by assembling various subsystems, including each element listed in the appended claims, in such a manner that prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems, total adjustment is performed to make sure that every accuracy is maintained in the complete photolithography system. Additionally, it is desirable to manufacture an exposure system in a clean room where the temperature and humidity are controlled.

Figure 9:
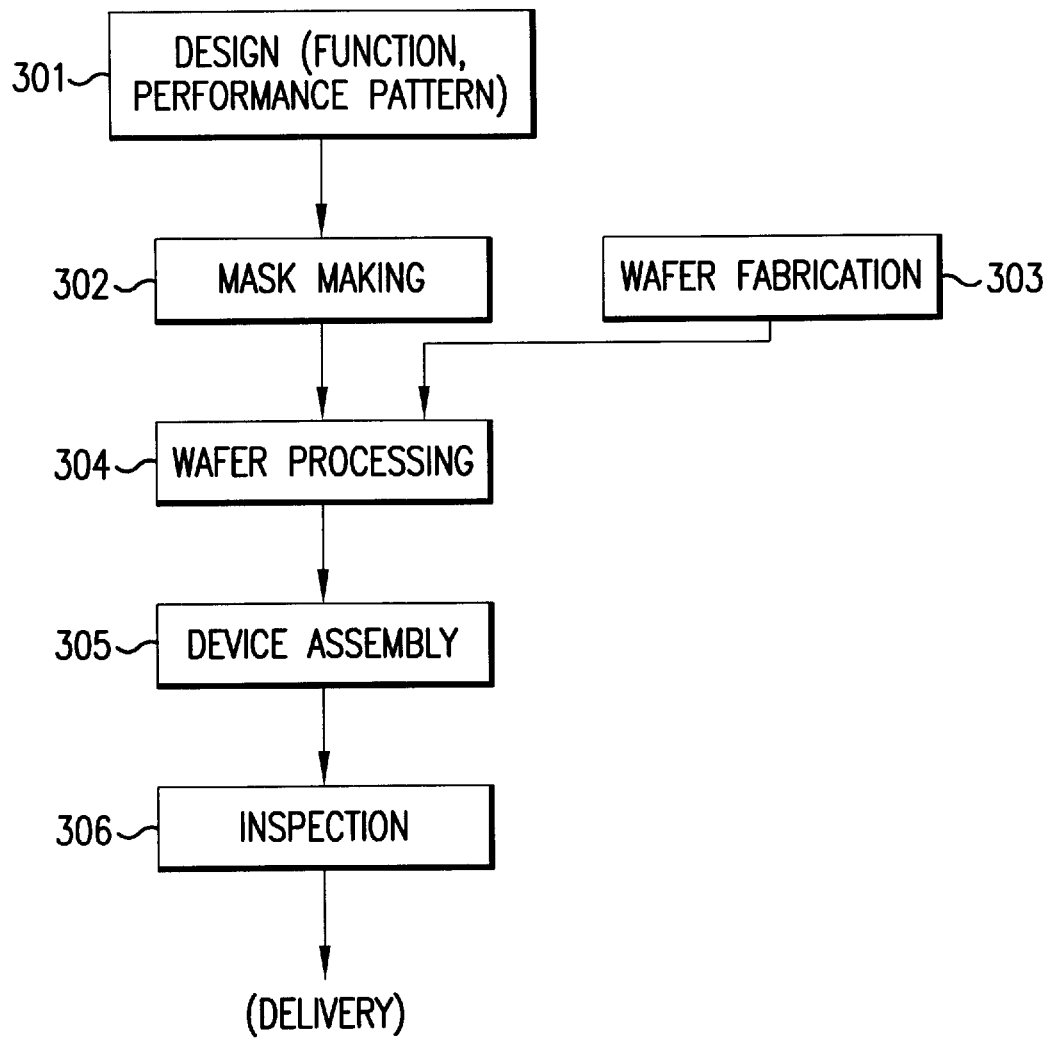
FIG. 9 shows an exemplary process that can be used to fabricate semiconductor devices.

Further, semiconductor devices can be fabricated using the above described systems, by the process shown generally in FIG. 9. In step 301 the device's function and performance characteristics are designed. Next, in step 302, a mask (reticle) having a pattern is designed according to the previous designing step, and in a parallel step 303, a wafer is made from a silicon material. The mask pattern designed in step 302 is exposed onto the wafer from step 303 in step 304 by a photolithography system described hereinabove consistent with the principles of the present invention. In step 305 the semiconductor device is assembled (including the dicing process, bonding process and packaging process), then finally the device is inspected in step 306.

Figure 10:
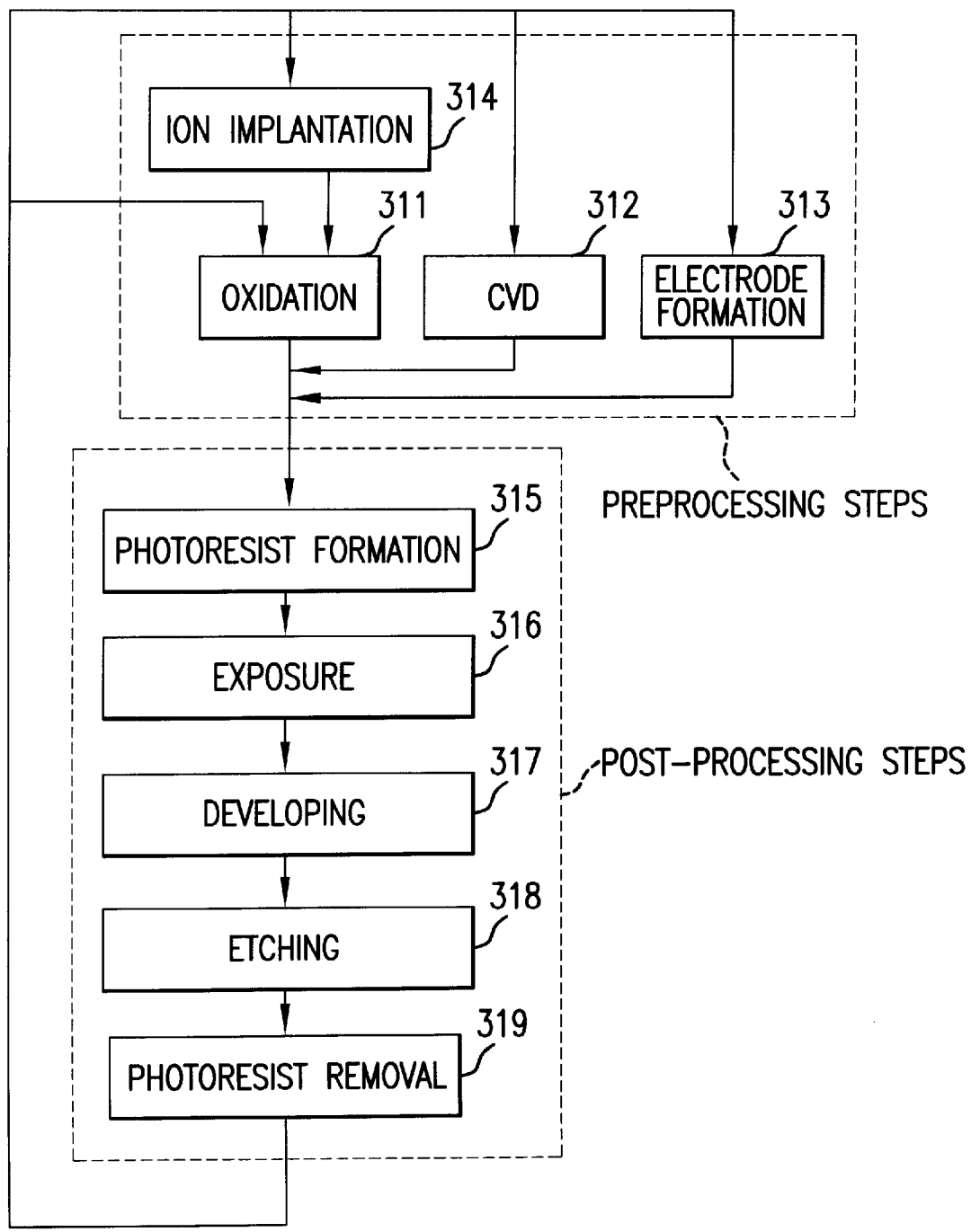
FIG. 10 illustrates a detailed flowchart of processing performed relative to a photolithography system being used to fabricate semiconductor devices.

FIG. 10 illustrates a detailed flowchart example of the above-mentioned step 304 in the case of fabricating semiconductor devices. In step 311 (oxidation step), the wafer surface is oxidized. In step 312 (CVD step), an insulation film is formed on the wafer surface. In step 313 (electrode formation step), electrodes are formed on the wafer by vapor deposition. In step 314 (ion implantation step), ions are implanted in the wafer. The above mentioned steps 311–314 form the preprocessing steps for wafers during wafer processing, and selection is made at each step according to processing requirements.

At each stage of wafer processing, when the above-mentioned preprocessing steps have been completed, the following post-processing steps are implemented. During post-processing, initially, in step 315 (photoresist formation step), photoresist is applied to a wafer. Next, in step 316, (exposure step), the above-mentioned exposure device is used to transfer the circuit pattern of a mask (reticle) to a wafer. Then, in step 317, (developing step), the exposed wafer is developed, and in step 318 (etching step), parts other than residual photoresist (exposed material surface) are removed by etching. In step 319 (photoresist removal step), unnecessary photoresist remaining after etching is removed.

Multiple circuit patterns are formed by repetition of these preprocessing and post-processing steps.

It will be apparent to those skilled in the art that various modifications and variations can be made in the methods described, in the stage device, the control system, the material chosen for the present invention, and in construction of the photolithography systems as well as other aspects of the invention without departing from the scope or spirit of the invention.

Although only a few exemplary embodiments of this invention have been described in detail above, those skilled in the art will readily appreciate that many modifications are possible in the exemplary embodiments without materially departing from the novel teachings and advantages of this invention. For example, although depicted as being planar, the arrays of magnetic poles and coils can have either constant or varying curvature in one or two-dimensions as in cylindrical, toroidal, and spherical arrangements of magnetic poles and coils. For cylindrical arrangements, latitudinal and longitudinal directions may be defined, for example, in standard cylindrical coordinates with corresponding diagonal directions, and parallel arrays and coils lie on parallel surfaces. Accordingly, all such modifications are intended to be within the scope of the following claims.

What is claimed is:

1. A method for controlling a planar electric motor comprising a magnet array having magnets with magnetic fields and a coil array comprising coils generally disposed in a plane, comprising:

determining currents to be applied to coils to generate forces between the magnet array and the coil array in first and second directions;

determining a resultant torque between the magnet array and the coil array generated by the forces generated by the determined currents;

determining current adjustments to compensate for the resultant torque such that a total torque between the magnet array and the coil array becomes a desired value; and applying a sum of the determined currents and determined current adjustments to the coils to interact with the magnetic fields of the magnet array to control the planar electric motor.

2. The method for controlling a planar electric motor of claim 1, wherein the magnetic fields of the magnet array are adjacent to a portion of the coil array.

3. The method for controlling a planar electric motor of claim 2, wherein the current adjustments are determined for each coil in the portion of the coil array.

4. The method for controlling a planar electric motor of claim 2, wherein currents to be applied to the coils is determined only for coils in the portion of the coil array.

5. The method for controlling a planar electric motor of claim 2, wherein the sum of the determined currents and determined current adjustments to the coils is applied only to coils in the portion of the coil array.

6. The method for controlling a planar electric motor of claim 5, wherein the coils in the portion of the coil array includes coils partially within the magnetic fields of the magnet array.

7. The method for controlling a planar electric motor of claim 1, wherein the magnet array is at least as large as eight coils of the coil array.

8. The method for controlling a planar electric motor of claim 1, further comprising determining the position of the magnet array relative to the coil array and using the position of the magnet array in determining currents, resultant torque or current adjustments.

9. The method for controlling a planar electric motor of claim 1, wherein currents to be applied to coils in a predetermined portion of the coil array are sinusoidal, triangular or square waveforms.

10. The method for controlling a planar electric motor of claim 1, further comprising determining forces to be generated between the magnet array and the coil array in the first and second directions to result in forces in the first and second directions or torque about a third direction, generally orthogonal to the first and second directions.

11. The method for controlling a planar electric motor of claim 1, wherein the current adjustments are determined such that a total force between the magnet array and the coil array remains the same.

12. A method for determining current to be applied to control a planar electric motor, the motor having a magnet array and a coil array having coils generally disposed in a plane, comprising:

determining currents to be applied to coils for generating forces between the magnet array and the coil array in first and second directions defined by the plane, the currents being dependent upon the position of the magnet array and desired forces in the first and second directions or torque about a third direction generally perpendicular to the first and second directions;

determining a resultant torque that would be generated by the currents; and determining current adjustments to be added to the currents to compensate for the resultant toque such that a total torque between the magnet array and the coil array becomes a desired value.

13. The method for determining current to be applied to control a planar electric motor of claim 12, further comprising determining a sum of the determined currents and determined current adjustments.

14. The method for determining current to be applied to control a planar electric motor of claim 12, wherein the currents are determined only for coils in a predetermined portion of the coil array within a magnetic field of the magnet array.

15. The method for determining current to be applied to control a planar electric motor of claim 14, wherein the coils in the portion of the coil array includes coils partially within the magnetic fields of the magnet array.

16. The method for determining current to be applied to control a planar electric motor of claim 12, wherein the current adjustments are determined such that a total force between the magnet array and the coil array remains the same.

17. A method for positioning a wafer in a lithography system, comprising:

providing a frame;

providing a stage for supporting the wafer and movable to position the wafer relative to the frame;

providing a coil array attached to the frame, the coil array having coils;

providing a magnet array adjacent a portion of the coil array, the magnet array being attached to the stage and having magnets generally disposed in a plane, the plane defining first and second directions;

determining current to be applied to coils in the portion of coil array to generate forces between the magnet array and the coil array in the first and second directions;

determining a resultant toque between the magnet array and the coil array generated by the forces;

determining current adjustments to compensate for the resultant torque such that a total torque between the magnet array and the coil array becomes a desired value; and applying a sum of the determined currents and determined current adjustments to the coils to interact with magnetic fields of the magnet array.

18. The method for positioning a wafer in a lithography system according to claim 17, further comprising determining position of the magnet array relative to the coil array and using the position of the magnet array in determining currents, resultant torque or current adjustments.

19. The method for positioning a wafer in a lithography system according to claim 17, wherein currents to be applied to coils in the portion of the coil array are sinusoidal, triangular or square waveforms.

20. The method for positioning a wafer in a lithography system according to claim 17, further comprising determining forces to be generated between the magnet array and the coil array in the first and second directions to result in forces in the first and second directions or torque about a third direction, generally orthogonal to the first and second directions.

21. The method for positioning a wafer in a lithography system according to claim 17, wherein the current adjustments are determined for each coil in the portion of the coil array.

22. The method for positioning a wafer in a lithography system according to claim 17, wherein currents to be applied to the coils are determined only for coils in the portion of the coil array.

23. The method for positioning a wafer in a lithography system according to claim 17, where in the sum of the determined currents and determined current adjustments to the coils is applied only to coils in the portion of the coil array.

24. The method for positioning a wafer in a lithography system according to claim 23, wherein the coils in the portion of the coil array include coils partially within the magnetic fields of the magnet array.

25. A method for making a wafer utilizing the positioning method of claim 17.

26. A method for making a device including at least the exposure process, wherein the exposure process uses the lithography system utilizing the method of claim 17.

27. The method for positioning a wafer in a lithography system according to claim 17, wherein the current adjustments are determined such that a total force between the magnet array and the coil array remains the same.

28. A planar motor comprising:

a first member;

a second member interacting with the first member to generate driving force, the second member being movable relative to the first member in at least two directions by the driving force; and a controller connected to at least one of the first and second members, the controller determining information related to a resultant torque between the first and second members generated by the driving force, the controller determining adjustment information to compensate for the resultant torque such that a total torque between the first and second members becomes a desired value.

29. The planar motor of claim 28, further comprising a measuring system connected to the controller, the measuring system detecting information related to the relative position between the first member and the second member; and wherein the controller determines the resultant torque based on the information related to the relative position between the first member and the second member.

30. The planar motor of claim 28, wherein the controller outputs the adjustment information to at least one of the first and second members to generate force for compensation of the resultant torque such that the total torque between the first and second members becomes the desired value.

31. The planar motor of claim 28, wherein the first member includes a magnet array having magnets and the second member includes a coil array having coils generally disposed in a plane, the plane defining a first and second direction and the direction of the driving force is substantially the same as the first and second direction.

32. The planar motor of claim 31, wherein the adjustment information includes current adjustment information.

33. A stage assembly including the planar motor of claim 28.

34. A lithography system including the stage assembly of claim 33.

35. A device manufactured with the lithography system of claim 34.

36. A device manufactured with the stage assembly of claim 33.

37. The planar motor of claim 28, wherein the controller determines the adjustment information such that a total force between the first and second members remains the same.

* * * * *

UNITED STATES PATENT AND TRADEMARK OFFICE
CERTIFICATE OF CORRECTION

PATENT NO. : 6,650,079 B2
DATED : November 18, 2003
INVENTOR(S) : Michael B. Binnard It is certified that error appears in the above-identified patent and that said Letters Patent is hereby corrected as shown below:

<u>Column 20,</u>
Line 43, "toque" should read -- torque --.

<u>Column 21,</u>
Line 10, "where in" should read -- wherein --.

Signed and Sealed this

Thirteenth Day of January, 2004

JON W. DUDAS
*Acting Director of the United States Patent and Trademark Office*